Figure 1:
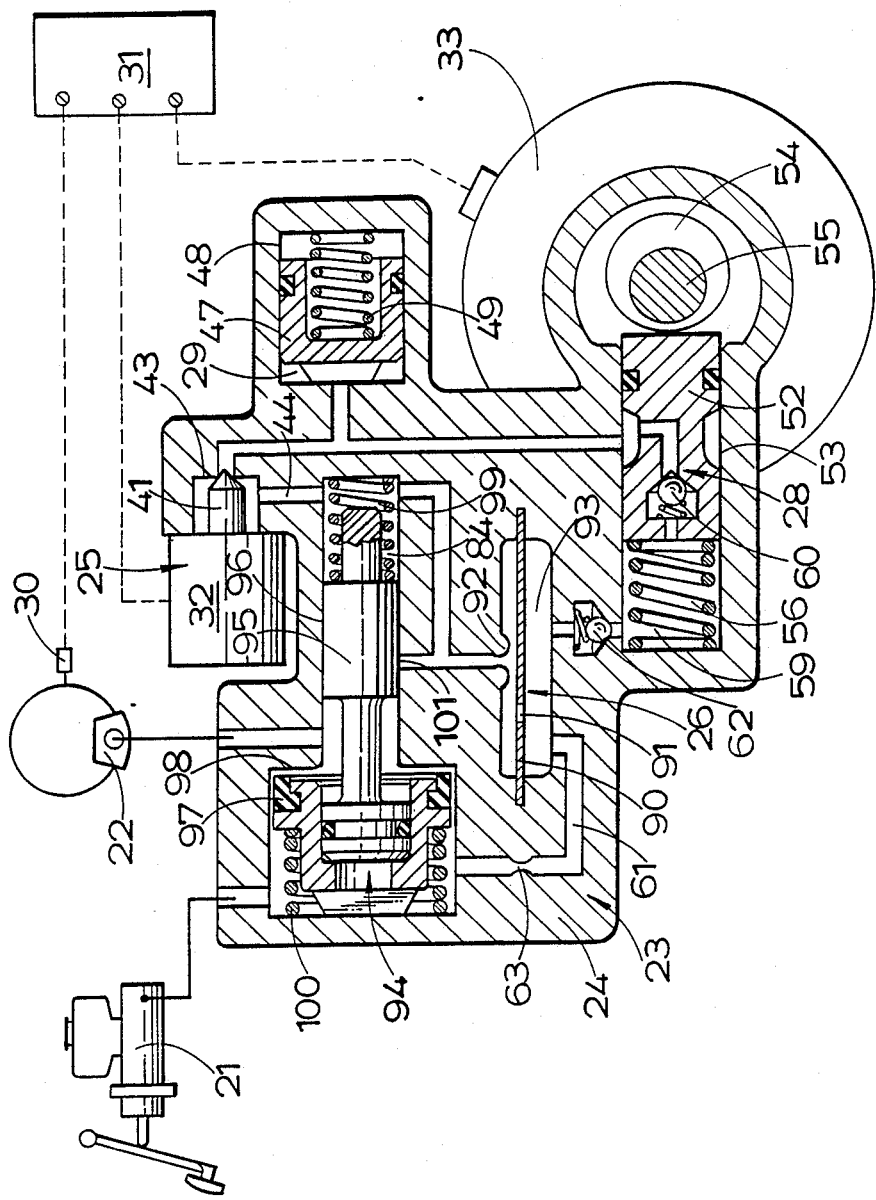

United States Patent [19]

Farr

[11] Patent Number: 4,929,037
[45] Date of Patent: May 29, 1990

[54] HYDRAULIC ANTI-LOCK BRAKING SYSTEMS FOR VEHICLES

[75] Inventor: Glyn P. R. Farr, Warwickshire, England

[73] Assignee: Lucas Industries public limited company, England

[21] Appl. No.: 317,937

[22] Filed: Mar. 2, 1989

[30] Foreign Application Priority Data

Mar. 9, 1988 [GB] United Kingdom ............... 8805598
Jul. 21, 1988 [GB] United Kingdom ............... 8817412

[51] Int. Cl.⁵ ........................ B60T 8/40; B60T 8/48; B60T 8/36
[52] U.S. Cl. ................................ 303/116; 303/61; 303/117; 303/119
[58] Field of Search ............... 303/61, 113, 114, 115, 303/116, 117, 119; 188/181 A, 181 R

[56] References Cited

U.S. PATENT DOCUMENTS

| | | | |
|---|---|---|---|
| 3,877,758 | 4/1975 | Kuwana | 303/115 |
| 4,350,396 | 9/1982 | Mortimer | 303/115 |
| 4,611,859 | 9/1986 | Otsuki et al. | 303/119 X |
| 4,715,666 | 12/1987 | Farr | 303/116 |
| 4,778,227 | 10/1988 | Bayliss | 303/119 |

FOREIGN PATENT DOCUMENTS 0065451 11/1982 European Pat. Off. ............ 303/119

*Primary Examiner*—Andres Kashnikow
*Assistant Examiner*—Timothy Newholm
*Attorney, Agent, or Firm*—Laff, Whitesel, Conte & Saret

[57] ABSTRACT

In a hydraulic anti-lock braking system a modulator incorporates a solenoid-operated valve responsive to anti-lock signals, a re-application valve and an expansion chamber to which fluid relieved from the brake in an anti-lock mode. The solenoid-operated valve determines the pressure in a control chamber, a poppet valve controls communication between the master cylinder and the brake, and a restricted connection is provided between the master cylinder and the output from a re-application pump.

6 Claims, 2 Drawing Sheets

HYDRAULIC ANTI-LOCK BRAKING SYSTEMS FOR VEHICLES

This invention relates to hydraulic anti-lock braking systems for vehicles of the kind in which the supply of hydraulic fluid from a supply, suitably a master cylinder, to a brake on a wheel is modulated in an anti-lock mode by a modulator in accordance with the behaviour of the braked wheel, and a pump is adapted to generate the energy necessary to recover fluid after the pressure applied to the brake has first been released to prevent the wheel from locking.

An anti-lock system of the kind set forth is disclosed in EP-A-0202845. In this known system the modulator incorporates a single solenoid-operated valve responsive to anti-lock signals, and a flow valve. For normal brake applications, the flow valve permits free flow from the master cylinder to the brake. In an anti-lock mode, however, fluid is relieved from the brake to an expansion chamber, and the flow valve is adapted to meter the flow of fluid from the master cylinder to the brake at a controlled rate. At the same time the pump is operative to return fluid from the expansion chamber back to the master cylinder. The flow valve and the pump rate are arranged to produce similar flow rates so that the reaction at the foot is minimal. However, because the output characteristic of the pump is cyclic and the flow valve characteristic is constant, the pumped activity is sensed as an reaction or "feel" at the brake pedal, accompanied by noise transmitted back through the bulkhead of the vehicle.

One way to reduce this sensitivity would be to add a restrictor within the line between the modulator and the master cylinder. This would interfere with the normal operation of the brake.

Alternatively a restrictor could be fitted between the pump and the flow valve. This would restrict the full pump output itself, and not the difference between the pump output and the flow valve output. In addition, damage to the pump might occur.

Another solution would be to locate a restrictor between the modulator and the master cylinder and provide a one-way valve to permit full flow from the master cylinder to the brake. To obtain a rapid release of brake pressure, another one-way valve would have to be located between the brake and the master cylinder. Although this solution is technically acceptable, it uses too many parts for it to be acceptable from a commercial standpoint.

According to our invention in a hydraulic anti-lock system of the kind set forth the modulator comprises a solenoid-operated valve for determining the pressure in a control chamber, a poppet valve for controlling communication between the master cylinder and the brake in accordance with pressure in the control chamber, an expansion chamber to which fluid is relieved from the brake in an anti-lock mode as determined the rate of re-application of pressure to the brake upon recovery of a braked wheel, and a restricted connection between the master cylinder and the output from the pump.

The poppet valve preferably comprises a spool responsive to pressure in the control chamber for controlling the supply of fluid to the brake through a passage, in combination with a relatively movable valve head which, in an open position, is normally spaced from a seating to provide unrestricted communication between the master cylinder and the brake, movement of the spool in a direction to open the passage being adapted to cause the head to co-operate with the seating to cut-off unrestricted communication between the master cylinder and the brake.

The re-application valve may comprise a flow valve operable automatically in conjunction with the solenoid-operated valve, or it may comprise a solenoid-operated inlet valve which is adapted to be pulsed to determined the rate of brake re-application following recovery of the wheel.

When the re-application valve comprises a flow valve, the flow valve may comprise a flexible diaphragm provided with a fixed orifice and which is movable with respect to a seating to define a variable orifice, the variable orifice being reduced in size in response to a pressure drop across the diaphragm to determine the rate of flow from the pump back to the brake.

In such a construction a chamber on one side of the diaphragm is connected to the passage so that the pressure drop across the diaphragm is established when the solenoid-operated valve opens to connect the brake to the expansion chamber.

The provision of the flexible diaphragm and the poppet valve render the system particularly suitable for manufacture by the use of mass produced components, since no accurate machining of valve components is required.

When the re-application valve comprises a solenoid-operated inlet valve, closure of the inlet valve isolates both the master cylinder and the pump from the passage.

Figure 2:
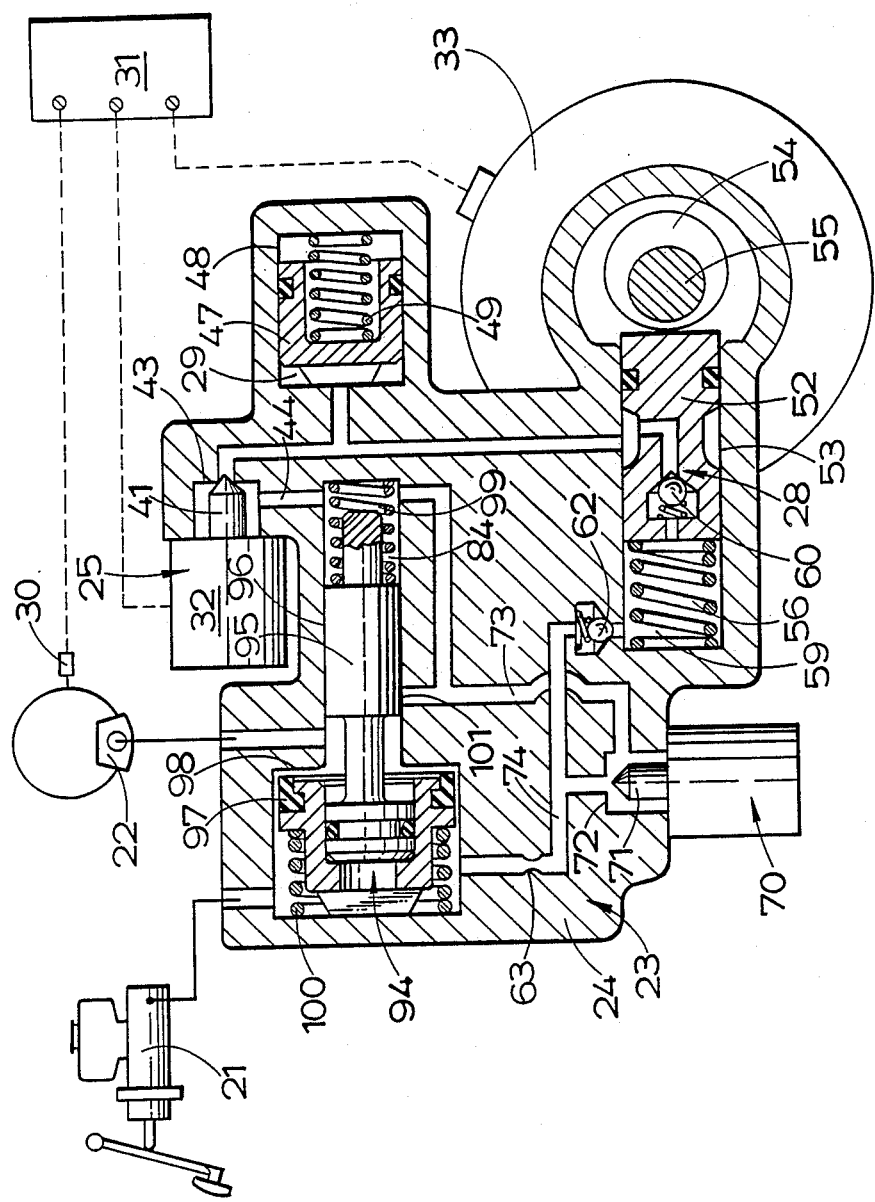

Two embodiments of our invention are illustrated in the accompanying drawings in which:

FIG. 1 is a schematic layout of an anti-lock hydraulic braking system in a normal brake-applying position; and FIG. 2 is similar to FIG. 1 but showing a modification.

The anti-lock braking system illustrated in FIG. 1 of the drawings comprises a pedal-operated hydraulic master cylinder 21 for operating a wheel brake 22, and a modulator 23.

The modulator 23 comprises a housing 24 in which is incorporated a solenoid-operated exhaust valve 25, a re-application valve comprising a flow-control regulator valve 26, a pump 28, and an expander chamber 29.

A wheel speed sensor 30 supplies electrical wheel speed signals to a control module 31. The control module 31 analyses; the speed signals and when it recognises a critical speed signal it causes an electrical current to energize the solenoid 32 of the exhaust valve 25 and also, separately, to operate an electric motor 33 for driving the pump 28.

The solenoid-operated exhaust valve 25 comprises an armature incorporating a valve head 41 which is normally urged into engagement with a seating 43 between a passage 44 leading to the regulator valve 26 and the expander chamber 29, by means of a spring. The chamber 29 constitutes a substantially constant, low pressure, reservoir for the pump 28 and is closed at its upper end by an expander piston 47 working in a bore 48. Normally a compression spring 49 urges the expander piston 47 into an advanced position in which the effective volume of the expander chamber 29 is at a minimum.

The pump 28 comprises a plunger 52 which works in a bore 53. The plunger 52 is driven in one direction during a power stroke by an eccentric cam 54 on a drive shaft 55 from the electric motor 33, and in the opposite direction, during an induction stroke, by a spring 56.

During the induction stroke fluid is drawn from the chamber 29 and into a pumping chamber 59 at the outer end of the stepped bore through a one-way inlet valve 60, and during the power stroke fluid is discharged from the chamber 59 and into a passage 61 leading to the master cylinder 21 and the regulator valve 26 through a one-way outlet valve 62. A restrictor 63 is located in the passage 61.

The passage 61 joins a passage 65 from the master cylinder at a branch 66 which comprises an inlet passage leading to the flow-control regulator valve 26 and located between the master cylinder 21 and the restrictor 63.

The flow valve 26 comprises a flexible diaphragm 90 provided with a fixed orifice 91 which establishes a pressure drop across the diaphragm 90. This controls the position of the diaphragm with respect to a seating 92 leading to the valve 25 and with which the diaphragm 90 co-operates in order to define a variable orifice. The chamber 93 on the side of the diaphragm 90 remote from the seating 92 is connected to the restrictor 63 and the output valve 62 from the pump 28.

A poppet valve 94 is located between the master cylinder 21 and the brake 22. As illustrated the poppet valve 94 comprises a spool 95 working in a bore 96 and exposed at one end to pressure on the downstream side of the flow valve 26. The spool 95 carries a head 97 which is relatively movable axially and which is normally spaced from a seating 98 between the master cylinder 21 and the brake 22 by the force in a spring 99. A light spring 100 is adapted to bias the head 97 in the opposite direction.

In the inoperative position shown in the drawing the pump 28 is disabled, the solenoid 32 is de-energized, and the head 97 is spaced from the seating 98 so that fluid can be supplied directly from the master cylinder 21 to the brake 22. The pressure from the master cylinder 21 is also supplied to the flow valve 26 through the restrictor 63, and through the flow valve 26 to a control chamber 84 at the inner end of the bore 96 and in communication with the passage 44. The diaphragm 90 is spaced from the seating 92 so that the master cylinder 21 communicates with the chamber 84 through the orifice 63 and the fixed orifice 91.

When the brake 22 is to be applied, fluid is supplied from the master cylinder 1 to the brake 22 through the open poppet valve 94.

In an anti-lock mode, the solenoid 32 is energized by the control module 31 which causes the valve member 41 to retract, momentarily to relieve pressure in the control chmaber 84 to the expansion chamber 29. This causes the spool 95 to move relatively against the force in the spring 99 to permit the head 97 to engage with the seating 98 under the influence of the spring 100. This isolates the master cylinder 21 from the brake 22. once the head 97 has engaged with the seating 98, the master cylinder pressure acts through an opening in the head 97 and onto the adjacent end of the spool 95 in turn to urge the spool 95 further in the same direction. This uncovers a port 101 leading both to the flow valve 26 and the control chamber 84. The pressure in the brake 22 is therefore relieved to the expansion chamber 29 through the port 101, and the control chamber 84. At the same time, due to the pressure drop across the diaphragm 90, the diaphragm 90 moves towards its seating 92 to meter fluid to the brake 22, and the control module 31 switches on the motor 33 to drive the pump 28. Fluid is then forced from the expansion chamber 29 back to an attenuation chamber containing the flow valve 26, and through the restrictor 63 to the master cylinder 21.

The pressure returned from the brake 22 to the expander chamber 29 moves the expander piston 47 relatively against the force in the spring 49. The pump 28 is operable to draw fluid at low pressure from the expander chamber 29 and into the pumping chamber 59 through the inlet valve 60, and then pump it from the chamber 59 and into the passage 61 through the outlet valve 62 as described above.

The output from the pump 28 is shared between the master cylinder 21 to which it is returned through the restrictor 63, and the brake 22 under the control of the flow valve 26. Specifically the output from the pump 28, minus the output via the flow control valve 26, is returned to the master cylinder 21.

When the wheel recovers the solenoid-operated valve 25 closes. The fluid withdrawn from the expansion chamber 29 by the pump 28 is pumped back to the brake 22 at a rate determined by flow through the flow valve 26, and back to the master cylinder at a rate determined by flow through the restrictor 63.

The flow valve 26 and the restrictor 63 automatically define an attenuation system since the flow valve 26 automatically provides an attenuation volume between the pump 28 and the restrictor 63 back to the master cylinder 21. The flow valve 26 gives better attenuation than a fixed "high" stiffness volume and has an effect similar, in practice, to that of an hydraulic accumulator. Pressure spikes from the pump 28 will cause the volume upstream of the flow valve 26 to increase, thus reducing its amplitude.

Since the flow from the pump 28 is split between the master cylinder 21 and the brake 22, the attenuation system only attenuates the flow back to the master cylinder 21.

Positioning the flow valve 26 between the restrictor 63 and the outlet from the pump 28 reduces the amplitude of the pressure oscillations fed back to the pump 28 compared with a "stiff" volume. This will reduce the wear on the pump 28, enabling its life to be increased.

The effect of the difference between the two outputs is reduced by the restrictor 63 and the attenuation chamber defined between the pump 28, the restrictor 63, and the flow valve 26.

When the brake pedal is released, fluid from the brake 22 flows back to the master cylinder 21 through the poppet valve 94. The poppet valve 94 opens fully when the spring-loaded spool 95 moves back.

In the system illustrated in FIG. 2 of the drawings the flow valve 26 is replaced by a solenoid-operated inlet valve 70 comprising a valve member 71 which is engageable with a valve seating 72. The seating 72 is disposed between a passage 73 leading to the port 101 and a passage 74 connecting the restrictor 63 to the one-way valve 62. In a normal open position the valve member 71 is held away from the seating 72 by means of spring (not shown).

In the inoperative position shown in the drawings, the poppet valve 94 and the inlet valve 70 are both open, and the exhaust valve 25 is closed.

When the master cylinder 1 is operated, fluid is supplied to the brake 22 through the open poppet valve 94. Fluid also passes through the restrictor 63 and the open inlet valve 70 to the chamber 84 where is acts on the adjacent end of the spool 95, to hold the poppet valve 94 open, and upon the closed exhaust valve 25. Normally, therefore, fluid can flow freely between the master cylinder 21 and the brake 22.

When the control module 31 recognizes that a skid signal has been emitted by the speed sensor 30, it is operative to energise the solenoids of both valves 70 and 25 to cause the inlet valve 70 to close and the exhaust valve 25 to open.

Closure of the valve 70 isolates the master cylinder 21 from the control chamber 84, and opening the valve 25 momentarily relieves pressure in the control chamber 84 to the expansion chamber 29. As in the system of FIG. 1, the spool 95 moves in the bore 96 against the force in the spring 99 to permit the head 97 to engage with its seating and isolate the master cylinder 21 from direct communication with the brake 22. The spool 95 then moves further in the same direction to uncover the port 101 in order to return fluid from the brake 22 to the expansion chamber 29. The pump 28 is then operative to witrhdraw fluid from the expansion chamber 29 and pump it back through the restrictor 63 to the master cylinder 21.

When the wheel recovers the solenoid-operated exhaust valve 25 closes. Subsequently the inlet valve 70 is pulsed to permit the output from the pump 28 to be directed back to the brake 22 through the passage 73 and the port 101. At the same time the pump 28 continues to return fluid to the passage 74 between the restrictor 63 and the inlet valve 70. only the difference in flow is therefore felt at the master cylindwer, namely the output from the pump 28 minus the amount re-admitted by pulsing the solenoid-operated amount re-admitted by pulsing the solenoid-operated inlet valve 70.

The construction and operation of the system of FIG. 2 is otherwise the same as FIG. 1 and corresponding reference numerals have been applied to corresponding parts.

I claim:

1. A hydraulic anti-lock braking system for vehicles comprising a master cylinder for applying hydraulic fluid under pressure to a brake on a wheel to apply said brake, a modulator responsive to the behaviour of said braked wheel to modulate the supply of fluid from said master cylinder to said brake in an anti-lock mode, and a pump having an output which generates the energy necessary to recover fluid after the pressure applied to said brake had first been released to prevent said wheel from locking, wherein said modulator comprises means defining a control chamber, a solenoid-operated valve for determining the pressure in said control chamber, a poppet valve for controlling communication between said master cylinder and said brake in accordance with pressure in said control chamber, means defining an expansion chamber to which fluid is relieved from said brake in an anti-lock mode, a re-application valve for determining the rate of re-application of pressure to said brake upon recovery of said braked wheel, and a restricted connection between said master cylinder and said output from said pump, and wherein said poppet valve comprises a means defining a passage, a spool responsive to pressure in said control chamber for controlling the supply of fluid to the brake through said passage, a valve seating, and a valve head movable relative to said spool and which, in an open position, is normally spaced from said seating to provide unrestricted communication between said master cylinder and said brake, movement of said spool in a direction to open said passage to cause said head to co-operate with the seating to cut-off unrestricted communication between said master cylinder and said brake.

2. A system as claimed in claim 1, wherein said re-application valve comprises a flow valve operable solenoid-operated valve.

3. A system as claimed in claim 2, wherein said flow valve comprises a seating, a flexible diaphragm provided with a fixed orifice and which is movable with respect to said seating to define a variable orifice, said variable orifice being reduced in size in response to a pressure drop across said diaphragm to determine the rate of flow from said pump back to said brake.

4. A system as claimed in claim 3, wherein a chamber on one side of said diaphragm is connected to said passage so that the pressure drop across said diaphragm is established when said solenoid-operated valve opens to connect said brake to said expansion chamber.

5. A system as claimed in claim 1, wherein said re-application valve coimprises a solenoid-operated inlet valve, and means for pulsing said inlet valve to determine the rate of brake re-application following recovery of said wheel.

6. A system as claimed in claim 5, wherein said solenoid-operated inlet valve is movable between an open position and a closed position, movement of said inlet valve into said closed position isolating both said master cylinder and said pump from said passage.

* * * * *